United States Patent
Wilf et al.

(10) Patent No.: US 7,584,061 B2
(45) Date of Patent: Sep. 1, 2009

(54) DEVICE FOR MEASURING PERMEATE FLOW AND PERMEATE CONDUCTIVITY OF INDIVIDUAL REVERSE OSMOSIS MEMBRANE ELEMENTS

(75) Inventors: Mark Wilf, San Diego, CA (US); Rich Franks, Fallbrook, CA (US); Craig Bartels, San Diego, CA (US); Norio Ikeyama, Nishinomiya (JP)

(73) Assignees: Hydranautics, Oceanside, CA (US); Nitto Denko Corporation, Osaka (JP)

( * ) Notice: Subject to any disclaimer, the term of this patent is extended or adjusted under 35 U.S.C. 154(b) by 29 days.

(21) Appl. No.: 11/716,798

(22) Filed: Mar. 12, 2007

(65) Prior Publication Data
US 2007/0209977 A1 Sep. 13, 2007

Related U.S. Application Data

(60) Provisional application No. 60/781,858, filed on Mar. 13, 2006.

(51) Int. Cl.
*G01N 15/08* (2006.01)
(52) U.S. Cl. .............................. 702/35; 702/34; 73/38; 73/865.8
(58) Field of Classification Search ............ 73/40–49.8, 73/865.8, 866.5, 38; 702/33, 34, 35, 36, 702/45, 50, 51
See application file for complete search history.

(56) References Cited

U.S. PATENT DOCUMENTS

| | | | |
|---|---|---|---|
| 2,701,645 A * | 2/1955 | Schild et al. ................... 210/92 |
| 3,417,870 A | 12/1968 | Bray | |
| 3,554,378 A | 1/1971 | Kohl | |
| 4,188,817 A * | 2/1980 | Steigelmann ............... 73/40.7 |
| 4,235,723 A | 11/1980 | Bartlett, Jr. | |
| 4,409,849 A | 10/1983 | Roos | |
| 4,496,461 A | 1/1985 | Leeke et al. | |
| 4,708,791 A | 11/1987 | Dillard, III | |
| 4,855,058 A | 8/1989 | Holland et al. | |
| 5,108,604 A | 4/1992 | Robbins | |
| 5,300,875 A | 4/1994 | Tuttle | |

(Continued)

FOREIGN PATENT DOCUMENTS

CN 1232718 A 10/1999

(Continued)

OTHER PUBLICATIONS

International Search Report for Application No. PCT/US07/06152, Mar. 12, 2008.

(Continued)

*Primary Examiner*—David A. Rogers
(74) *Attorney, Agent, or Firm*—Knobbe, Martens Olson & Bear LLP

(57) ABSTRACT

The present disclosure relates to a system comprising an integrated sensor for measurement of permeate flow and permeate conductivity of individual membrane elements while they are in operation in an RO unit. The flow and conductivity measuring integrated sensor is of a small size that enables it to be inserted into the permeate tube of connected membrane elements during RO unit operation. Measured flow and conductivity information is transferred to the recording device through electric wires or through wireless transmission.

13 Claims, 8 Drawing Sheets

U.S. PATENT DOCUMENTS

| | | | |
|---|---|---|---|
| 5,461,385 | A | 10/1995 | Armstrong |
| 5,528,222 | A | 6/1996 | Moskowitz et al. |
| 5,581,017 | A * | 12/1996 | Bejtlich, III ............... 73/38 |
| 5,674,381 | A | 10/1997 | Den Dekker |
| 5,905,197 | A * | 5/1999 | Wilf ............... 73/86 |
| 6,040,773 | A | 3/2000 | Vega et al. |
| 6,224,767 | B1 | 5/2001 | Fujiwara et al. |
| 6,324,898 | B1 * | 12/2001 | Cote et al. ............... 73/38 |
| 6,549,176 | B2 | 4/2003 | Hausladen |
| 6,558,444 | B1 | 5/2003 | Hunter |
| 6,607,501 | B2 | 8/2003 | Gorsuch |
| 6,609,070 | B1 | 8/2003 | Lueck |
| 6,617,963 | B1 | 9/2003 | Watters et al. |
| 6,971,274 | B2 | 12/2005 | Olin |
| 7,216,529 | B2 * | 5/2007 | Ventresque et al. ............ 73/40 |
| 7,228,726 | B2 * | 6/2007 | Kates ............... 73/40 |
| 7,410,581 | B2 * | 8/2008 | Arnold et al. ......... 210/321.85 |
| 7,481,917 | B2 | 1/2009 | Ikeyama et al. |
| 2002/0189667 | A1 | 12/2002 | O'Dougherty et al. |
| 2003/0017804 | A1 | 1/2003 | Heinrich et al. |
| 2003/0128812 | A1 | 7/2003 | Appleby et al. |
| 2004/0104171 | A1 * | 6/2004 | Zeiher et al. ............... 210/652 |
| 2004/0112529 | A1 | 6/2004 | Karlsson et al. |
| 2004/0118776 | A1 * | 6/2004 | Zeiher et al. ............... 210/636 |
| 2005/0029192 | A1 * | 2/2005 | Arnold et al. ............... 210/641 |
| 2005/0060974 | A1 | 3/2005 | Palmerton et al. |
| 2005/0194317 | A1 | 9/2005 | Ikeyama et al. |
| 2005/0263386 | A9 * | 12/2005 | Pitts et al. ............... 204/164 |
| 2005/0284806 | A1 * | 12/2005 | Husain et al. ......... 210/321.83 |
| 2006/0130663 | A1 * | 6/2006 | Joshi et al. ............... 96/224 |
| 2007/0018819 | A1 * | 1/2007 | Streeb et al. ............ 340/572.1 |
| 2007/0240492 | A1 | 10/2007 | DiLeo et al. |
| 2007/0272628 | A1 * | 11/2007 | Mickols et al. ............... 210/790 |
| 2008/0105038 | A1 * | 5/2008 | Jons et al. ............... 73/38 |
| 2008/0296208 | A1 | 12/2008 | Ikeyama et al. |
| 2009/0032477 | A1 | 2/2009 | Ikeyama et al. |

FOREIGN PATENT DOCUMENTS

| | | | |
|---|---|---|---|
| CN | 1993171 A | | 7/2007 |
| DE | 3740249 C | | 11/1988 |
| DE | 196 27 595 A | | 1/1997 |
| DE | 201 04 481 U1 | | 6/2001 |
| DE | 101 60 429 A1 | | 6/2003 |
| DE | 10254599 A1 | | 6/2003 |
| EP | 0 700 313 B1 | | 11/1996 |
| JP | 05-345181 | | 12/1993 |
| JP | 2002-150241 | | 5/2002 |
| JP | 2006-195809 | | 7/2006 |
| JP | 2007-527318 | | 9/2007 |
| JP | 2008-049250 | | 3/2008 |
| JP | 2008-080254 | | 4/2008 |
| WO | WO 98/35327 A1 | | 8/1998 |
| WO | WO 98/41306 | | 9/1998 |
| WO | WO 00/40322 | | 7/2000 |
| WO | WO 00/32298 | | 8/2000 |
| WO | WO 00/45324 A3 | | 8/2000 |
| WO | WO 00/50849 A1 | | 8/2000 |
| WO | WO 00/67221 | | 11/2000 |
| WO | WO 02/15139 A1 | | 2/2002 |
| WO | WO 2007/030647 | | 3/2007 |
| WO | WO 2007/108977 A2 | | 9/2007 |

OTHER PUBLICATIONS

"RFID System Site Survey" Presentation to Hydranautics, a Nitto Denko Company, by GBN on Nov. 10, 2003.

"HYDRAcap® Superior Ultrafiltration Membrane Technology" brochure by Hydranautics, A Nitto Denko Corporation (2001).

International Search Report for PCT/US06/34905 mailed Mar. 22, 2007.

Written Opinion for PCT/US06/34905 mailed Mar. 22, 2007.

Annex to European Search Report for application EP 05724483, mailed Mar. 13, 2007.

Co-pending U.S. Appl. No. 12/282,742, entitled "Device for Measuring Permeate Flow Conductivity of Individual Reverse Osmosis Membrane Elements", filed Sep. 12, 2008.

* cited by examiner

DEVICE FOR MEASURING PERMEATE FLOW AND PERMEATE CONDUCTIVITY OF INDIVIDUAL REVERSE OSMOSIS MEMBRANE ELEMENTS

RELATED APPLICATIONS

This application claims the benefit under 35 U.S.C. § 119 (e) of U.S. Provisional Application No. 60/781,858, filed Mar. 13, 2006, the entirety of which is hereby incorporated by reference herein.

BACKGROUND OF THE INVENTION

1. Field of the Invention

The present disclosure relates to a measuring device and system that allows convenient and simultaneous measurement of flow and conductivity of permeate produced by reverse osmosis elements while they are installed in a pressure vessel and operated in an RO train.

2. Description of the Related Art

Spiral wound reverse osmosis membrane elements are widely used for the desalination of water in plants of increasingly higher capacity. A commercial membrane element measures 1000 mm (40 inches) in length and 200 mm (8 inches) in diameter and weighs about 16 kg (40 lbs). A single element produces a permeate flow of 12 $m^3$/d-24 $m^3$/day (3200-6400 gallons per day). A single desalination plant producing 200,000 $m^3$/day (50 million gallons of water per day) of permeate may require as many as 15,000 such spiral wound elements to produce the designed permeate capacity. The individual elements are loaded into fiberglass pressure vessels arranged in racks to form a single RO train. In large RO systems one train may consist of 100-200 pressure vessels. Several trains may operate independently in any single desalination plant. Six to eight elements are loaded into a single pressure vessel. Accordingly, 600 to 1600 elements may operate in a single train. Once loaded in the pressure vessels, membrane elements are only removed at the time of element replacement (usually every 3-10 years of operation) or when required for special testing. Removal of membrane elements from pressure vessels requires the complete shut down of RO train operation.

The performance of individual elements is usually known prior to installation in the RO system. After installation, the performance of elements may change due to membrane fouling. The effect of membrane performance deterioration is observed by measuring the permeate flow, permeate conductivity and pressure drop of a complete RO train. In some cases, the permeate conductivity of individual pressure vessels can be measured. Measurement of permeate flow and permeate conductivity of individual elements is not practical with current technology in a commercial RO unit. Usually, the effect of fouling on element performance is not uniform through the system. After performance of an RO system has deteriorated to a certain level, a performance improvement can be achieved by membrane cleaning or partial or complete replacement with new elements. The major obstacle to efficient element replacement is the absence of a convenient method for measuring the performance of individual elements while they are installed and operating in an RO train.

SUMMARY OF THE INVENTION

In an aspect, a system that permits assessment of performance of a reverse osmosis membrane element is provided that comprises: the reverse osmosis membrane element; a permeate tube within the reverse osmosis membrane element; an elongated probing tube within the permeate tube of the reverse osmosis membrane element; at least one sensor configured to measure a value used to assess the performance and disposed at an inlet side of the probing tube; and a recording device in electronic communication with the sensor so as to record results of the measurement.

In a further aspect, the sensor configured to measure a value used to assess the performance comprises a mechanism for measuring permeate flow.

In a further aspect, the sensor for measuring permeate flow comprises a thermal anemometer sensor.

In a further aspect, the system also comprises a sensor for measuring permeate conductivity.

In a further aspect, the sensor for measuring permeate conductivity comprises a conductivity cell with an integrally mounted thermocouple.

In a further aspect, a power source powers the sensor.

In a further aspect, the power source comprises at least one radio frequency identification (RFID) tag.

In a further aspect, the electronic communication is conducted via wiring connecting the recording device and the sensor.

In a further aspect, the electronic communication is conducted via a wireless connection connecting the recording device and the sensor.

In a further aspect, the sensor is additionally provided with an RFID tag, and the value is linked to a reverse osmosis membrane element via communication between the RFID tag and an RFID tag mounted on the element.

In an aspect, a method of assessing performance of reverse osmosis membrane elements is provided, the method comprising: providing a system in a pressure vessel, the system comprising a reverse osmosis membrane element, a permeate tube within the reverse osmosis membrane element, an elongated probing tube within the permeate tube of the reverse osmosis membrane element, at least one sensor configured to measure a value used to assess the performance and disposed at an inlet side of the probing tube, and a recording device in electronic communication with the sensor so as to record results of the measurement; measuring at least one value; transmitting results of the measurement to the recording device; and assessing the performance based on the results.

In a further aspect of this method, at least one value comprises data relating to permeate flow.

In a further aspect of this method, at least one value additionally comprises data relating to permeate conductivity.

In a further aspect of this method, the sensor is additionally provided with an RFID tag, and the value is linked to a reverse osmosis membrane element via communication between the RFID tag and an RFID tag mounted on the element.

In a further aspect of this method, the method additionally comprises replacing the element if the assessment indicates replacement is required to improve system performance.

DETAILED DESCRIPTION OF THE PREFERRED EMBODIMENT

Figure 1:
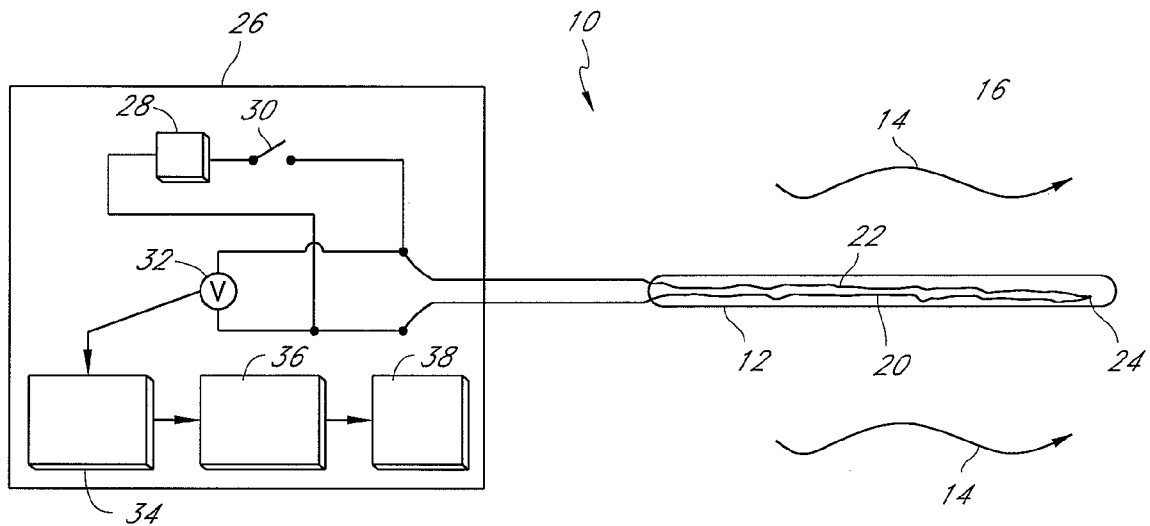
FIG. 1 is a partial schematic and partial block diagram of one embodiment of a thermal anemometer that may be employed in the measurement system.

Embodiments comprise an integrated sensor device that enables simultaneous measurement of permeate flow and permeate conductivity inside the permeate tube of membrane elements, while the elements are in operation in the RO unit. Particularly preferred embodiments comprise a thermal anemometer sensor and conductivity sensor mounted on an elongated small diameter support tubing. This sensor device can be inserted through a permeate port of a pressure vessel into permeate tubes of membrane elements operating and connected together in a pressure vessel. As the sensor is moved along the permeate tube it generates electric signals that are related to the permeate flow rate and permeate conductivity at various points along the pressure vessel. The electric signal is either transmitted through the wires connecting the sensors with an outside recording device or by generating and sending a wireless transmission of the measured data.

The electric energy required to power the thermal anemometer sensor and conductivity sensor (collectively described as the "measuring devices") can be supplied by radio frequency radiation, a rechargeable battery, power transformed from a radio frequency identification (RFID) tag, electromagnetic energy, energy from a turbine mounted on the small diameter support tubing, or other forms of energy supply known to those skilled in the art. The measuring devices of preferred embodiments are preferably powered by RFID tags. The RFID tags are preferably activated by electromagnetic energy emitted by devices that retrieve information from RFID tags, such as a receiver situated inside or outside the pressure vessel. When activated, the RFID tags preferably transmit power to the measuring devices, which take their measurements. In particularly preferred embodiments, the data is stored in the RFID tags, which may be instantaneously and/or later retrieved. In other preferred embodiments, the measuring devices are powered by rechargeable batteries. For example, such batteries include, but are not limited to, nickel cadmium batteries, lithium ion batteries, and other batteries known to those skilled in the art. In preferred embodiments the batteries may be recharged by energy transmitted from activated RFID tags. In other preferred embodiments, the measuring devices may be activated by radio frequency (RF) energy from an outside source. Further embodiments comprise measuring devices which are powered by magnetic energy, electromagnetic energy, or other forms of energy known to those skilled in the art.

Permeate Flow Measurement

In an embodiment of the device, the permeate flow is measured using a thermal anemometer. Examples of such devices are disclosed in U.S. Pat. Nos. 5,271,138; 4,794,794; 4,848,147; 4,621,929; and 4,537,068, which are incorporated in their entirety by reference.

In general, a thermal anemometer measures fluid velocity by sensing the changes in heat transfer from a small, electrically-heated element exposed to the fluid.

If a wire is immersed in a fluid and is heated by an electric current, the temperature of the wire increases and the power input is:

$$I^2 R_w = h_w S_w (T_w - T_f) \quad (1)$$

Where:
I: value of electric current,
$R_w$: resistance of the wire
$h_w$: heat transfer coefficient of the wire
$S_w$: the surface area of the wire
$T_w$: temperature of the wire
$T_f$: temperature of the fluid The resistance of the wire is also a function of temperature:

$$R_w = R_0[1 + \alpha(T_w - T_0)] \quad (2)$$

Where:
$R_0$ is resistance of the wire at the reference temperature
$\alpha$ is coefficient of thermal resistance of the wire
$T_0$ is the reference temperature The heat transfer coefficient of the wire $h_w$ is a function of the fluid velocity $v_f$ according to the following equation:

$$h_w = a + b^* v_f^c \quad (3)$$

where a, b and c are coefficients obtained by calibration.

Combining the above three equations we can eliminate heat transfer coefficient hw and rearrange to solve for fluid velocity:

$$V_f = \{(I^2 R_0 [1 + \alpha(T_w - T_0)]/S_w(T_w - T_0) - \alpha)/b\}^{1/c} \quad (4)$$

The cooling effect produced by the flow passing over the element is balanced by the electrical current to the element, so that the element is held at a constant temperature. The change in current due to a change in flow velocity shows up as a voltage at the anemometer output.

An embodiment of a thermal anemometer suitable for use in the device for measuring permeate flow and permeate conductivity will now be described. Referring to FIG. 1, one embodiment of a thermal transient anemometer fluid flow measuring device useful in preferred embodiments is designated generally by the reference numeral 10. The device 10 includes a thermocouple sensing probe 12 which can be inserted into a fluid flow path, illustrated by arrows 14 to measure the flow velocity.

The fluid flow 14 can be contained in a conduit or duct 16, such as a permeate tube. The thermocouple probe 12 includes a pair of calibration wires 20, 22 which are connected to form a conventional thermocouple junction 24 located adjacent to the end of the probe 12.

In this embodiment, the thermocouple 12 is illustrated as being a sheath type probe, specific examples of which are illustrated in FIGS. 6-10. An unsheathed probe also could be utilized. The sheath protects the junction 24 from the effects of the fluid flow 14.

A simple, preferably electronic, control unit 26 is illustrated in block form. The control unit 26 may be located at a site remote from the thermocouple probe 12, as shown for example in FIG. 14, in which the thermocouple probe is located at the distal end of support tube 173 and control unit 26 may be located within recording device 174. The unit 26 includes a power supply 28 which is coupled to one of the wires 22 through a pulsing switch 30.

The unit includes a voltage measuring instrument 32, which is coupled to a voltage versus time recorder 34. The voltage and time measurements are coupled to a calculation unit 36, which correlates the fluid flow velocity from the temperature decay or time constant of the probe 12. The calculation unit 36 is coupled to an output or display unit 38, which can generate a visual and/or hard copy output.

Figure 2:
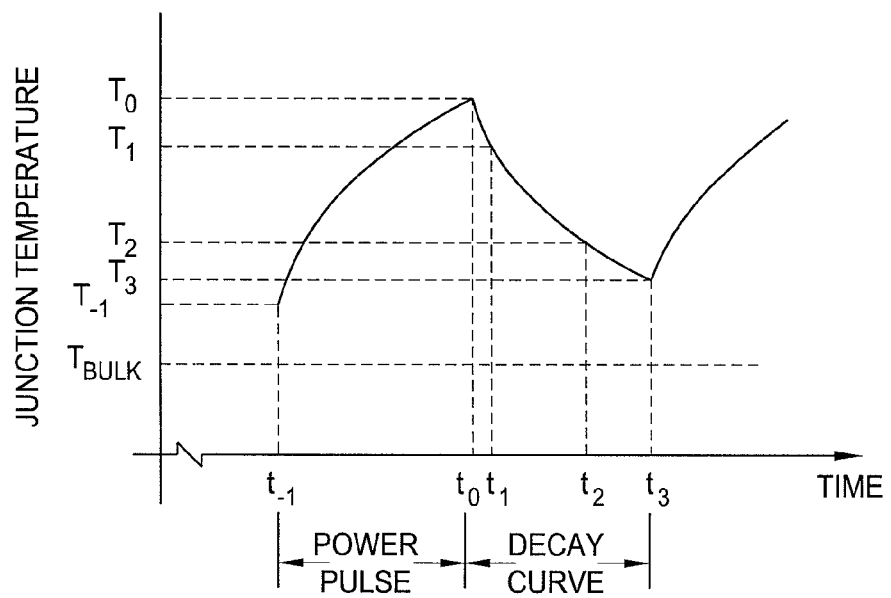
FIG. 2 is a graph illustrating the cyclic operation of the probe in the thermal anemometer.

The cyclic operation of the device 10 and the probe 12 is best illustrated with respect to FIG. 2. At a time $t_{-1}$, the pulse switch 30 is closed, coupling a relatively high voltage pulse across the wires 20 and 22 for a time period of $(t_0-t_{-1})$. The temperature of the probe 12 near the junction 24 is raised by resistance heating to a temperature above that of the fluid to be measured. For example, in typical fluid flow measurements, the temperature of the probe can be raised 5 to 10° F. above that of the fluid. As described hereinafter, the power pulse does not require accurate control or measurement.

At time $t_0$, the switch 30 is opened to remove the power from the wires 20, 22. When the power is removed, the temperature distribution in the thermocouple 12 begins to relax. At time $t_1$, the temperature $T_1$ of the junction 24 is measured by the instrument 32 which couples the measurement to the recorder 34. At a second time $t_2$, the temperature $T_2$ of the junction 24 again is measured by the instrument 32 and again is coupled to the recorder 34.

The two measurements, $T_1$ and $T_2$, then are utilized in the unit 36 to calculate the corresponding flow velocity of the flow 14 in accordance with the analysis provided hereinafter with respect to FIGS. 3 and 4. At time $t_3$, the cycle again can be repeated if desired. The temperatures $T_1$ and $T_3$ are totally unrelated and do not need to be the same value. A second conventional reference thermocouple junction may be required where the fluid bulk temperature is not substantially constant.

Figure 3:
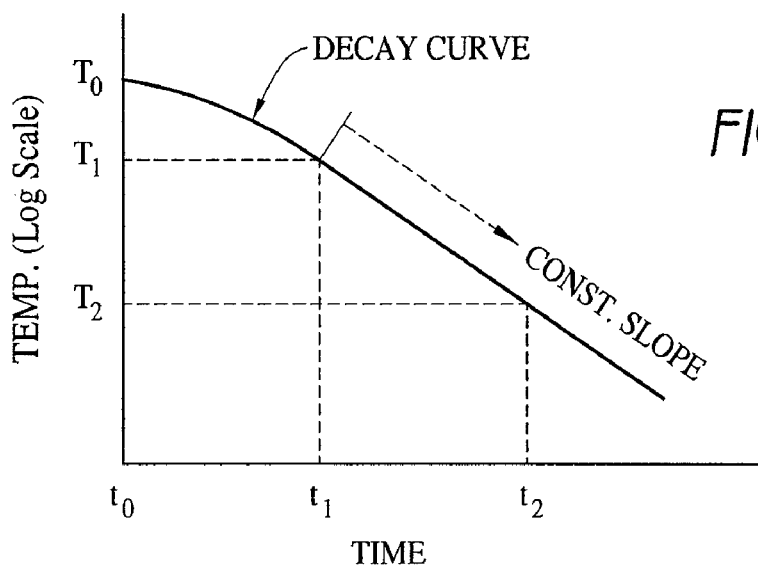
FIG. 3 is a graph of the characteristic temperature decay of a thermocouple probe.

A mathematical analysis of the temperature decay of the junction 24 is characterized by the graph illustrated in FIG. 3. Initially, at time $t_0$, the junction 24 has some arbitrary temperature profile described by a temperature function, $f(r)$. Modeling the probe 12 as an infinitely long, homogeneous solid cylinder, the temperature distribution as functions of radius 'r' and time 't' can be described by the classical series solution of equation 5 below. This discussion is made under the zero reference theory, where the fluid temperature is assumed to be zero, so that the probe temperature "T" actually represents a difference from the reference temperature. In actual practice, the fluid temperature would be measured and known, so that the corresponding measured difference between the fluid and probe temperatures could easily be correlated mathematically.

Where:

$$T = \frac{2}{a^2}\sum_{n=1}^{\infty} e^{-k a n^2 t}\left[\frac{an^2 J_o(\alpha_n r)}{(h^2 + \alpha_n^2)J_0^2(\alpha_n a)}\right]\int_o^a rf(r)J_o(an^r)dr \quad (5)$$

T=temperature differential between probes and fluid at given radius and time r=radius
a=outside radius of cylinder
t=time
H=convective coefficient at cylinder surface
h=H/K
k=K/ρC
ρ=density
C=heat capacity
K=thermal conductivity within the cylinder
Jo=Bessel function of order zero
$\alpha_n$=roots of the transcendental equation 2

$$\alpha J'_o(a\alpha)+hJ_o(a\alpha)=0 \quad (6)$$

After a sufficient decay time, $t_0$-$t_1$, the initial temperature conditions in the probe 12 relaxes and all terms, in the same series, approach zero, accept one. The decay equation after time, $t_1$, can be approximated by:

$$T = A_1 e^{-k\alpha_1^2 t} \quad (7)$$

where $$A_1 = \frac{2a_1^2}{a_2}\frac{J_o(\alpha_1 r_o)}{(h^2 + \alpha_1^2)J_o^2(\alpha_1, a)}\int_o^a rf(r)J_o(\alpha_1 r)dr$$

$A_1$ is a constant for fixed initial conditions, flow conditions and radial position, r; and $\alpha_1$, is the smallest root (eigenvalue) of the transcendental equation 6.

Figure 4:
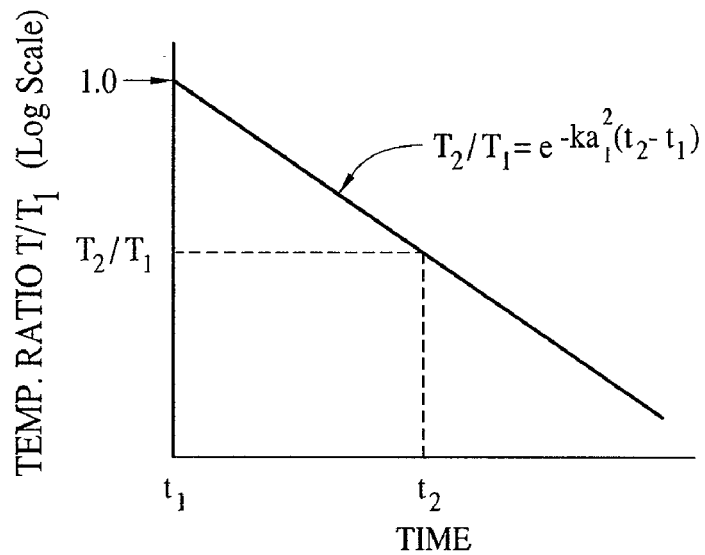
FIG. 4 is a semi-log plot of the normalized temperature decay of a thermocouple probe.

A semi-log plot of equation 7 starting at time, $t_1$, and normalized to $T_1$, is shown in FIG. 4. The slope of this curve is constant and approximated by equation 8. Significantly, the initial conditions cancel and, therefore, the slope is independent of the power pulse's shape, duration, radial position and magnitude. Utilizing equation 8 and from equation 6 recognizing that H is a function of $\alpha_1$, the convective coefficient, H, can be determined by using equation 8A.

$$\frac{\ln T_2/T_1}{t_2 - t_1} = -k\alpha_1^2 = \text{Slope} \quad (8)$$

or $$\alpha_1 = \sqrt{-\rho\frac{C}{K}\times \text{slope}} \quad (8A)$$

From fluid dynamic considerations, the convective coefficient at the surface of the probe can be approximated using a correlation for fluid cross flow over a cylinder in the form of equation 9.

$$H=CRe^n \quad (9)$$

Where $$Re=vd/\gamma \text{(Reynolds Number)} \quad (9A)$$

d=outside diameter of cylinder
v=local fluid velocity
γ=dynamic viscosity and C and n are known empirical constants over large ranges of Re numbers. Substituting equation 9A into equation 9 yields equation 10.

$$v = \frac{\gamma}{d}\left(\frac{H}{C}\right)^{1/n} \quad (10)$$

Thus, with measured temperature values, $T_1$ and $T_2$, the local flow velocity, v, can be calculated using equations 6, 8A and 10.

For small internal thermal resistances (Biot #=hd<1) local fluid velocity is approximately related to the slope in equation 8 utilizing equation 11. Hence, for fixed fluid and probe properties, a log-log plot of v vs. slope, results in a straight line with slope n.

$$v^n = \text{Slope} \times \text{Constant For Biot \#} < 1 \quad (11)$$

The above constant is a calibration constant dependent upon fixed probe and fluid properties. A database for different fluids and/or fluid temperatures can then be developed. The exponent 'n' is a known constant over large ranges of Re numbers and is given as 0.466 for the range of Re numbers from 40 to 4,000.

Thus, with measured normalized slope values (from equation 8) the local flow velocity, v, can be calculated using equation 11. The total flow in the duct 16 based upon the local velocity reading or readings then can be calculated utilizing fluid conditions, duct size, probe location, etc. as utilized in many conventional flow measurement methods.

Figure 5:
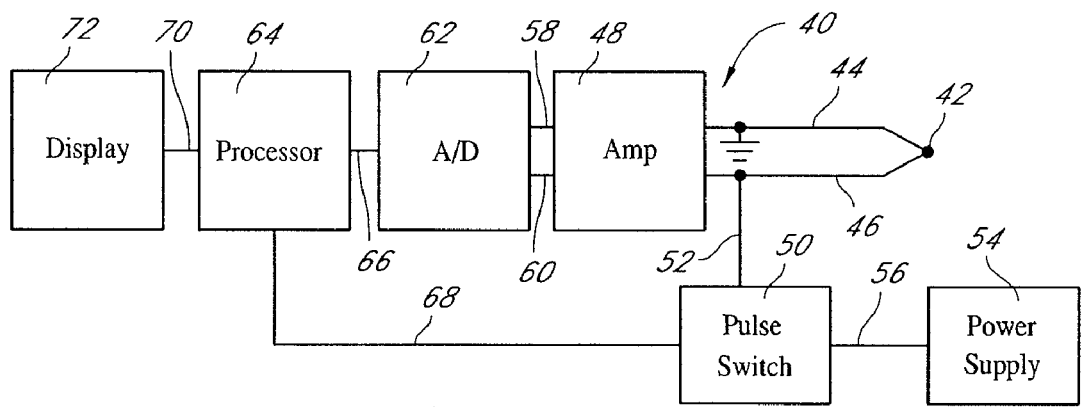
FIG. 5 is a block diagram of one logic circuit that may be employed in a thermal anemometer useful in a measurement system in accordance with an embodiment.

A generalized block and schematic logic circuit of another embodiment of an anemometer which may be used in an embodiment is designated generally by the reference numeral 40 in FIG. 5. A thermocouple junction 42 is coupled by a pair of calibration wires 44 and 46 to an amplifier 48. The wire 44 conveniently can be grounded and the wire 46 is coupled to a pulse switch 50 via a line 52. The pulse switch 50 is coupled to a power supply 54 via a line 56.

The amplifier 48 is coupled via wires 58 and 60 to an analog-to-digital converter (A/D) 62. The output of the A/D converter 62 is coupled to a processor 64 via a line 66. The processor 64, such as a microcomputer or microprocessor, also is coupled via a line 68 to the switch 50 and via a line 70 to a display 72. Although not illustrated, appropriate filtering can be provided at the input to the amplifier 48 to isolate the amplifier 48 from the transient power pulses applied to the junction 42, if desired.

In the device 40, the processor 64 controls the timing of the pulses applied to the junction 42 by the pulse switch 50 and the power supply 54. The voltage from the junction 42 is amplified by the amplifier 48 and converted into digital signals to be utilized by the digital process which then can be displayed in the display 72. Although digital signals are most preferable along with the utilization of a microprocessor for the processor 64, an analog logic processor also could be utilized in which case the processor 64 and associated circuitry could be eliminated.

The devices 10 and 40 have good stability, repeatability and sensitivity. The devices 10 and 40 readily can be adapted for simultaneous multiple flow measurement techniques. Thermocouples have an established history of reliability, accuracy and durability and the devices 10 and 40 benefit from the incorporation of the thermocouple concept. Specific thermocouple designs are illustrated in FIGS. 6-10.

In conventional thermocouples, the entire thermocouple length is heated by applying sufficient power thereto. A decrease in power consumption can be obtained by heating only the tip area of the thermocouple around the thermocouple junction. The following probes described especially in FIGS. 6-10 are designed to utilize standard fabrication techniques to minimize manufacturing costs. The utilization of sheath type thermocouples allows their established history of reliability, accuracy and durability to be incorporated into the devices 10 and 40. Further, the thermocouples are modified to minimize the power requirements for decreasing operating costs and to enhance portable battery powered applications.

Figure 6:
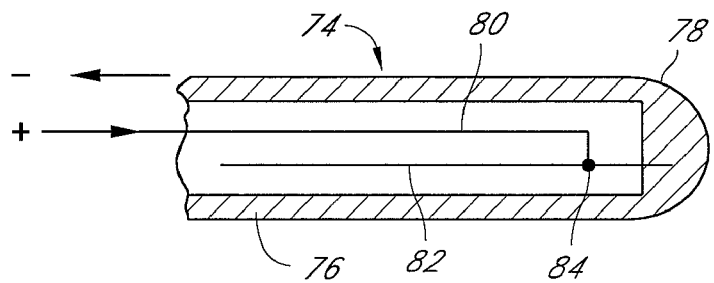
FIGS. 6-10 are embodiments of sheath type probes that may be employed in the thermal anemometer.

Referring to FIG. 6, a first embodiment of a sheath type thermocouple probe 74 is best illustrated. The probe 74 includes a sheath outer body 76 ending in a closed tip 78. A first calibration wire 80 is formed to have a relatively low electrical resistance by forming the wire 80 from a highly conductive material and/or a large wire diameter. A second calibration wire 82 is formed to have a relatively high electrical resistance by forming the wire 82 from a poor conductive material and/or a small wire diameter.

A junction 84 is formed adjacent the tip 78 and the wire 82 is grounded to the tip 78 and hence the sheath body 76. The tip 78 is locally heated adjacent the junction 84. The local heating of the tip 78 is accomplished by applying a relatively high voltage across the low resistance wire 80 and the sheath body 76. The current thus flows through the wire 80 to the junction 84 with negligible resistance heating. From the junction 84, the current flows through the high resistance wire 82 to the grounded tip 78. The wire 82 is thus heated between the junction 84 and the tip 78 to locally heat the tip 78. The current flow through the sheath body 76 generates a minimal or negligible resistance heating. The temperature sensing of the probe 74 is performed by utilizing the Seebeck effect between the wires 80 and 82 at the junction 84.

Figure 7:
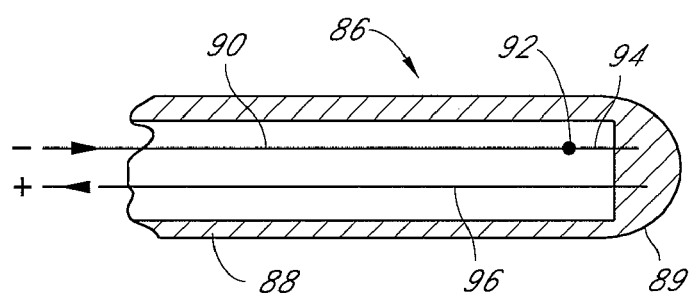

A second embodiment of a sheath type thermocouple probe 86 is illustrated in FIG. 7. The probe 86 includes a sheath body 88 with a tip 89. A first low resistance calibration wire 90 is connected at a junction 92, just prior to the tip 89, to a high resistance wire portion 94 which is grounded to the tip 89. A second low resistance calibration wire 96 is also grounded to the tip 89.

The local heating of the tip 89 during the applied power pulse is accomplished by applying a relatively high voltage across the wires 90 and 96. Due to the high electrical conductivity of the wires 90 and 96, the only significant resistance heating occurs in the high resistance wire portion 94 adjacent the tip 89. The temperature sensing of the probe 86 is accomplished by utilizing the Seebeck effect between the wires 90 and 96. The wire 96 also can be eliminated and the voltage then can be applied across the wire 90 and the sheath body 88.

Figure 8:
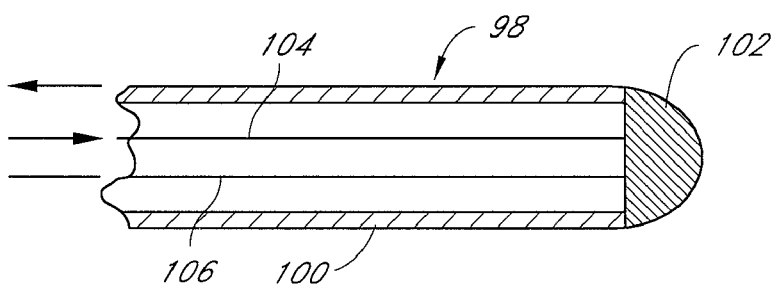

A third sheath type thermocouple probe embodiment is designated generally by the numeral 98 in FIG. 8. The probe 98 also has a low resistance sheath body 100, however, the probe 98 has a tip 102 formed from a high electrical resistance material. A pair of low resistance calibration wires 104 and 106 are grounded to the tip 102. The tip 102 is locally heated by applying a relatively high voltage across the wires 104 and 106 which are of high conductivity causing the only significant resistance heating to occur in the tip 102. Temperature sensing is again accomplished by utilizing the Seebeck effect between the wires 104 and 106. Alternatively the voltage can be applied across the sheath body 100 and one of the calibration wires, which eliminate the need for the other calibration wire to be formed of a low resistance wire.

Figure 9:
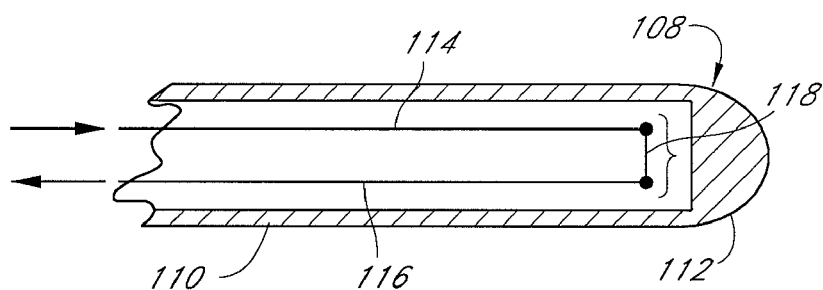

Another sheath type probe embodiment 108 is illustrated in FIG. 9. The probe 108 includes a sheath body 110 having a tip 112. A pair of relatively low resistance wires 114 and 116 are connected adjacent the tip 112 by a portion of high resistance wire 118. The tip 112 is locally heated by applying a relatively high voltage pulse across the pair of wires 114 and 116 which resistance heats the portion 118 to in turn heat the tip 112.

Temperature sensing of the probe 108 again is accomplished by utilizing the Seebeck effect between the pair of wires 114 and 116.

Figure 10:
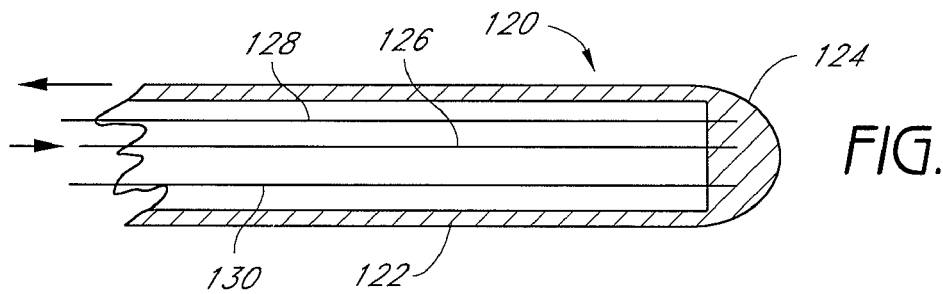

A fifth embodiment of a sheath type thermocouple probe 120 is illustrated in FIG. 10. The probe 120 includes a sheath body 122 having a tip 124. A low electrical resistance wire 126 is grounded to the tip 124. To accomplish local heating of the tip 124, either the tip 124 can be a high resistance material such as the tip 102 (FIG. 8) or the wire 126 can include a high resistance portion at the tip such as the wire portion 94 (FIG. 7). A pair of calibration wires 128 and 130 are utilized for temperature sensing by utilizing the Seebeck effect between the wires 128 and 130.

Alternatively, four or more multi-wire configurations also can be utilized. For example, two wires can be utilized for providing the power pulse and two separate calibration wires can be utilized for the Seebeck effect temperature sensing. Another alternative is leaving the calibration wires 128 and 130 ungrounded in a similar fashion to a conventional ungrounded thermocouple.

Figure 11:
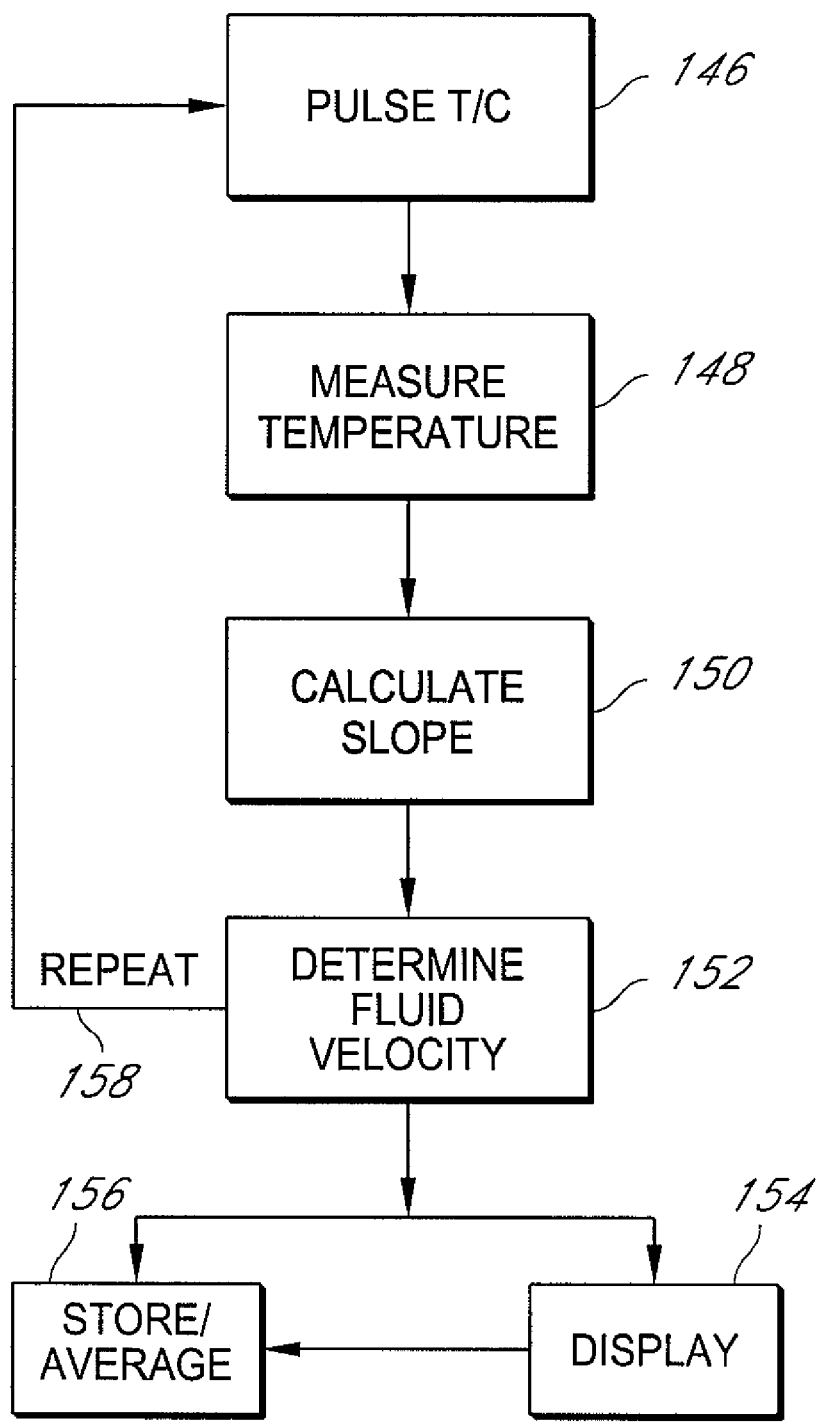
FIG. 11 is a flow chart of the operation of the thermal anemometer.

A flow diagram of the operation of the flow measuring device 10 is illustrated in FIG. 11. The thermocouple (t/c) 12 is first pulsed as indicated by a block 146 such, as over time period $t_0$-$t_{-1}$ in FIG. 2. The temperature is then measured, as indicated by a block 148, at least twice, such as at times $t_1$, $t_2$, etc. in FIG. 2, as the junction temperature decays. The slope of the decay curve is then calculated as indicated by a block 150, in accordance with Equation 8. The fluid velocity then is determined from the slope, as indicated by a block 152 in accordance with Equation 11.

The velocity determined from each power pulse set of measurements then can be displayed as indicated by a block 154. Alternatively or in addition, the velocity determined by a power pulse can be stored and averaged with succeeding pulse measurements, as indicated by a block 156. Each velocity value can be displayed, and the average also can be displayed, or only the average velocity need be displayed. The average can be a running average or can be for a fixed time period. After each velocity is determined, the sequence again can be repeated as indicated by a line 158.

Modifications and variations are possible in light of the above teachings. The heating of the probes can be effected as described by electrical resistance heating (Joule heating). The heating or cooling of the probes relative the fluid also can be effected by Peltier heating or cooling. The sheath type probes can include a conventional potting material if desired. The calibration wires generally are formed from thermocouple alloys. The addition in some probe embodiments of a separate wire portion or the probe tip between the calibration wires, does not affect the measurement as long as the junctions are maintained substantially at the same temperature. It is therefore to be understood that thermal anemometers useful in preferred embodiments include those that are otherwise than as specifically described.

Alternate embodiments of the flow meters comprise rotatable members. Such liquid flow meters can comprise an impeller or turbine mounted in the liquid flow path and the inlet end of the support tube, wherein the number of rotations of the impeller or turbine provide a measure of the liquid flow volume therethrough. The liquid flow meters may provide an electrical circuit for detecting the rotation of movement of the impeller or turbine, wherein it is typical to connect a magnetic element to the rotatable shaft and to provide a coil or inductive pickup circuit in proximity to the magnet, wherein the rotating magnet generates varying magnetic fields to influence the circuitry coupled to the pickup, and to thereby generate electrical signals representative of shaft rotation. The electrical signals are subsequently amplified and converted to drive signals for energizing some form of indicating device, such as an RFID tag.

One embodiment comprises a liquid flow meter, wherein a magnet is affixed to the rotatable impeller shaft. A magnetic field sensor, in the form of a ferromagneto resistive circuit, is placed in physical proximity to the rotatable magnet, and the magnetic field induces an electrical signal in the sensor, which signal is amplified and shaped to drive a suitable logic network, the logic network serving to both count the sensed signals and to calculate a corresponding flow volume indication.

Another embodiment of the flow meter utilizes magnets. For example, a first magnet is affixed to the rotatable impeller shaft, and a second magnet is placed in proximity to the first magnet, but outside of the liquid flow chamber. Rotation of the second magnet is induced by the rotating field of the first magnet, and the rotating field generated by the second magnet is detected by an inductive sensor to generate an electrical signal representative of the shaft rotation. The electrical signal is then utilized to drive an indicator circuit to provide a readout of the volume flow detected by the device.

Another embodiment comprises a flow meter utilizing shaft-mounted magnets. For example, a meter has a first magnet attached to a rotor shaft and a second magnet attached to an indicator shaft, the second magnet being rotatably and magnetically coupled to the first magnet, so as to provide corresponding rotation of the indicator shaft when the rotor shaft is rotated by the flow of fluid through the meter housing.

Another embodiment comprises a liquid flow meter of the rotating turbine or impeller type, wherein liquid flow through the meter results in positive rotatable displacement of a shaft made from a nonmagnetic material. A permanent magnet is embedded proximate one end of the shaft, and the impeller end shaft is rotatably mounted in a housing made from nonmagnetic materials. A magnetically-operated reed switch is positioned outside the housing proximate the shaft end embedding the permanent magnet, and each complete revolution of the shaft causes two magnetically-induced closures of the reed switch. The reed switch is electrically coupled to a battery-operated logic circuit, including counters and an electronic readout, so that switch closures of the reed switch are converted into flow volume data provided to an RFID tag, for example.

The internal design of the rotatable impeller and flow meter cavity are controlled to provide predetermined volumetric displacement characteristics, wherein each revolution of the impeller is matched to the logic circuit so as to provide a predetermined fractional relationship between the liquid flow volume passed during a single revolution of the shaft and the unit of measure in which the logic circuit and display are adapted to count and display units. The unit of measurement may therefore be modified by merely changing one linear dimension of the rotatable turbine or impeller.

Permeate Conductivity Measurement

Preferred embodiments also comprise measuring devices which monitor the electrical properties of the permeate stream. The operation of devices that measure water conductivity are preferably based on a measurement of the water resistivity between two electrodes. A resistivity measuring sensor can preferably be mounted at the some position as the flow measuring device. As described above, the permeate flow is measured using a thermal anemometer.

Preferred embodiments of a permeate conductivity measuring device comprise measuring devices which monitor the electrical properties of a liquid. The operation of devices that measure water conductivity are preferably based on measurement of liquid resistivity between two electrodes. A device that measures current flow between at least two electrodes can preferably be located on or within in a core tube of a reverse osmosis filter device and/or system. Examples of such devices are disclosed in U.S. Pat. Nos. 3,867,688, and 4,132,944, which are hereby incorporated in their entirety by reference. Electric energy required to power such devices can be supplied by radio frequency radiation, a rechargeable battery, power transferred from an RFID tag, electromagnetic energy, or other forms of energy known to those skilled in the art.

Figure 13:
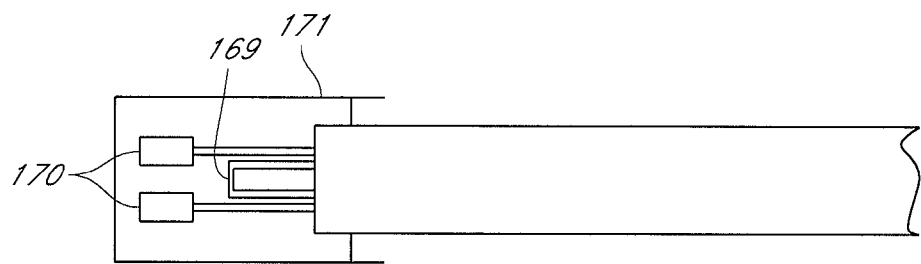
FIG. 13 shows the configuration of an integrated thermal anemometer sensor and conductivity sensor device mounted on a support.

The permeate conductivity measuring device of the preferred embodiments consists of a conductivity cell which has an integrally mounted thermocouple. As shown in FIG. 13, the electrodes of the conductivity measuring device 170 are installed within open shield 171 of the measuring device. When the conductivity cell is connected across an a.c. sine wave excitation source, the resulting current is proportional to the cell admittance. This current is resolved into two orthogonal components: a charging current which leads the excitation voltage by 90° and is proportional to the dielectric constant (k) of the liquid between the electrodes of the conductivity cell, and an ohmic current which is in phase with the excitation voltage and is proportional to the reciprocal of the resistance, or conductance, of the liquid.

Temperature compensation for the real component of the admittance (conductance) can be based on the Arrhenius absolute rate model. Accordingly, conductance is preferably a function of the thermal energy (RT), and the activation energy $\Delta E^{\neq}$ which separates equilibrium positions of the conducting species. The conductance G at a process temperature T may be corrected to a conductance $G_o$ at the reference temperature $T_o$ by the equation:

$$G_o = G 10^{b(T_o-T)} \quad (12)$$

or, $$\text{Log } G_o = \log G + b(T_o-T)$$

where:
$b = \Delta E^{\neq}/[2.303 \text{ R } T_{ok}^2]$, in which
$\Delta E^{\neq}$ = activation energy in calories/mole
R = the gas constant in calories/(mole ° K.), and
$T_{ok} = T_o$ in degrees Kelvin The thermocouple embedded in the permeate conductivity measuring device produces a signal proportional to the process liquid temperature T, while constant signals analogous to the reference temperature $T_o$ and to b are generated by appropriate circuitry. These analog signals proportional to T, $T_o$ and b, are combined to form a signal representing the expression $b(T_o-T)$. The log G function is generated from the signal representative of the conductance G, added to the signal representing $b(T_o-T)$, and sent to an antilog amplifier, whose output signal is representative of the desired conductance value $G_o$ of the liquid.

The imaginary component of the admittance when divided by the excitation frequency in radians per second is the capacitance C of the liquid at the processing temperature T. Based on the simple volume expansion for the liquid and the Debye model for dilute solutions of polar molecules, the temperature dependence of the dielectric constant k of the liquid takes the form $$k = k_o - \alpha(T-T_o), \quad (13)$$

as reported in the National Bureau of Standards circular 514. In terms of measured capacitance, $$C_o = C - aC(T_o-T), \quad (14)$$

where $C_o$ is the capacitance of the liquid at the reference temperature $T_o$, $K_o$ is the dielectric constant of the liquid at the reference temperature $T_o$, $\alpha$ is the volume expansion coefficient, and $a = \alpha/K_o$.

This equation assumes that the capacitance $C'_o$ of the cell in air at the reference temperature $T_o$ is approximately equal to the capacitance C of the liquid at the measured process temperature T divided by the dielectric constant k of the liquid at the process temperature T. This assumption was made to allow the use of different conductivity cells having different $C'_o$ values, without changing any of the circuit values, and is accurate so long as the dielectric constant variation with temperature is no more than plus or minus ten percent, which is the case for water at the temperatures and pressures normally found in RO filtration systems.

A signal proportional to $a(T_o-T)$ is generated by the same method used to form the $b(T_o-T)$ term in the conductance compensation circuit. The signal proportional to the capacitance C of the liquid and the signal proportional to $a(T_o-T)$ are supplied to an analog multiplier which generates a signal proportional to the product of these two signals, $aC(T_o-T)$. This product signal is then electrically subtracted from the capacitance signal C to produce a signal proportional to the capacitance $C_o$ of the liquid at the reference temperature $T_o$.

Figure 15:
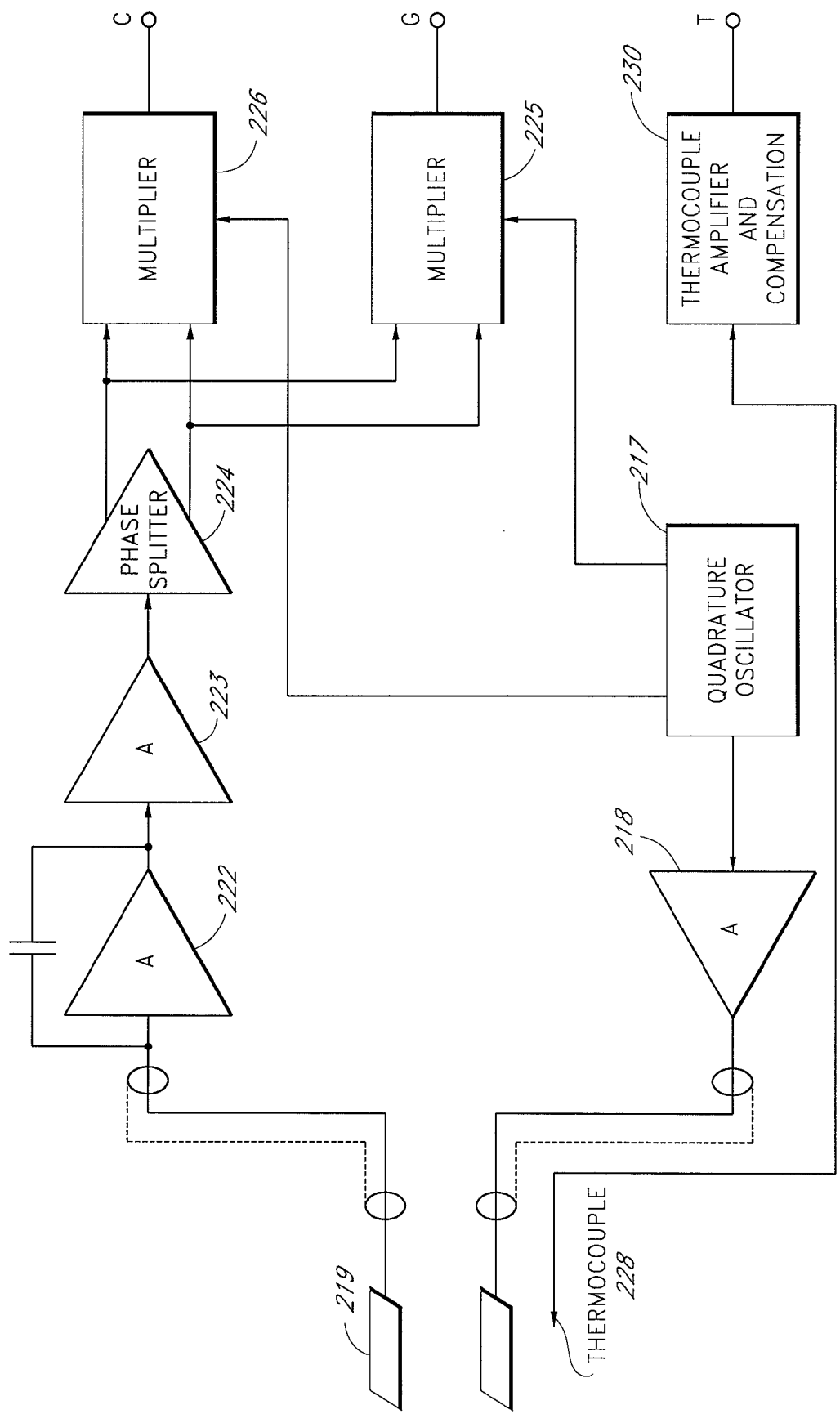
FIG. 15 shows a schematic block diagram of a conductivity probe that may be used in a measuring system in accordance with an embodiment.

For example, in one preferred embodiment of a permeate conductivity measuring device, as shown in FIG. 15, a quadrature oscillator 217 generates a 1000 Hz sine wave voltage, which is amplified by an amplifier 218 and applied to a conductivity cell 219 of a liquid sensor probe immersed in the liquid being processed through shielded lines. The current flowing through the conductivity cell 219 is converted into a proportional voltage by a current transducer 222, and amplified by a narrow band amplifier 223. This amplified voltage signal is then divided into two signals of opposite polarity by the phase splitter 224, which are supplied to respective circuits of a first multiplier 225 and a second multiplier 226.

In the first multiplier 225, the phase splitter output signals are preferably multiplied by a square wave voltage signal generated by the quadrature oscillator 217 which is in phase with the voltage applied across the conductivity cell 219, to produce an output signal proportional to the real component of the current flowing through the conductivity cell 219, and thus proportional to the conductance G of the liquid.

In the second multiplier 226, the phase splitter signals are preferably multiplied by a second square wave voltage signal, generated by the quadrature oscillator 217, which is 90° out-of-phase with the voltage applied across the conductivity cell 219, to produce an output signal proportional to the imaginary component of the current flowing through liquid in the conductivity cell 219, and thus proportional to the capacitance C of the liquid at its processing temperature T.

The liquid sensor probe also preferably includes a thermocouple 228 embedded in it, which produces a signal proportional to the temperature of the liquid at the probe. This temperature signal is amplified, and made linear with temperature in an amplifier and compensation circuit 230.

Figure 16:
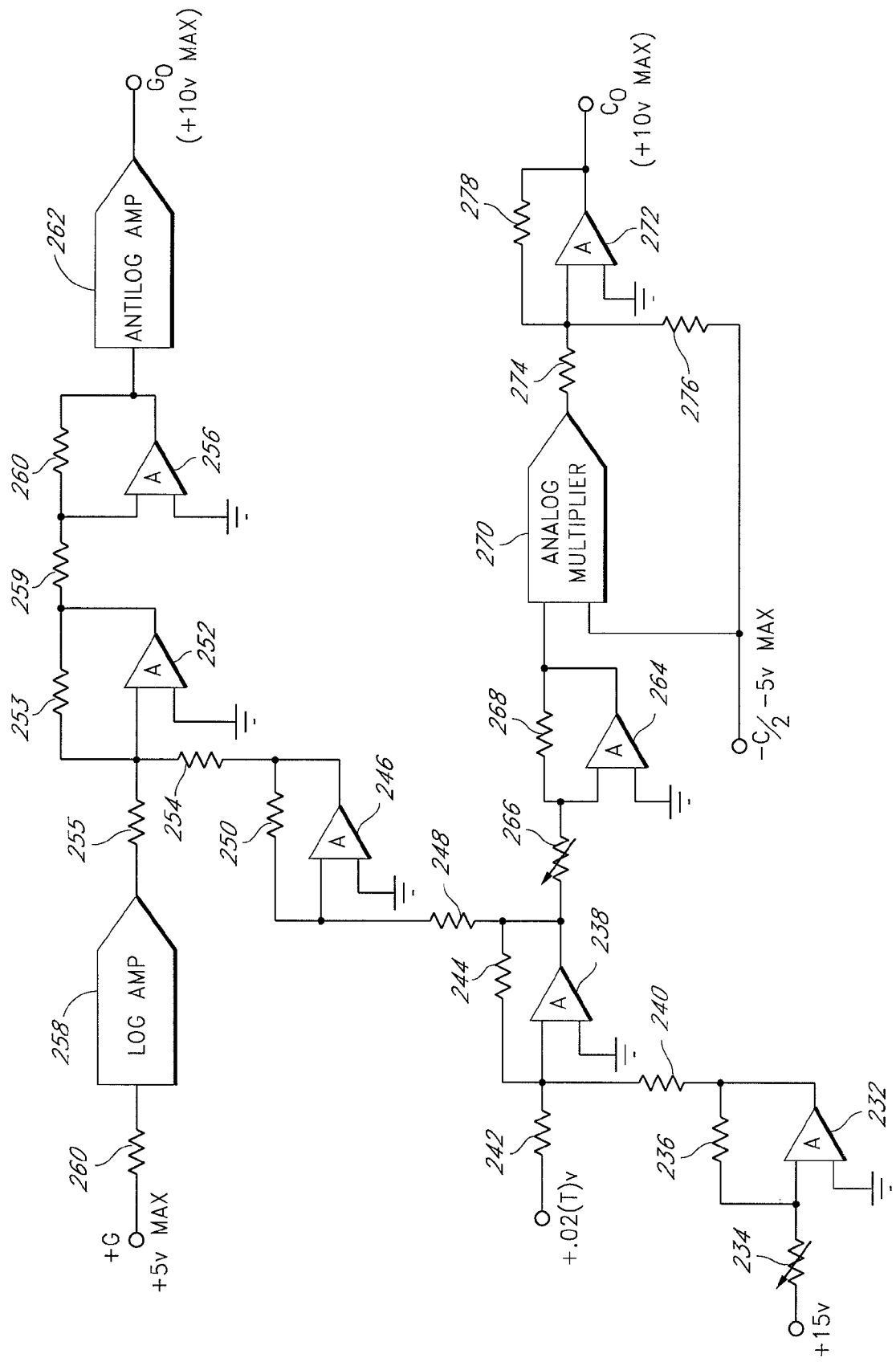
FIG. 16 shows a schematic diagram of temperature compensation circuits of the conductivity probe of FIG. 15.

In preferred embodiments, this compensated temperature signal is directly proportional to the liquid process temperature T, and is utilized in the temperature compensation circuit of FIG. 16, together with a signal proportional to the reference temperature $T_o$, to convert the signals proportional to the conductance G and the capacitance C of the liquid at the measured temperature T to respective signals proportional to the conductance $G_o$ and the capacitance $C_o$ of the liquid at the reference temperature $T_o$. In most applications of this monitoring apparatus, the reference temperature $T_o$ is selected to be about the average temperature of the liquid during the processing operation, so that temperature compensation is only made over the range from the highest to the lowest temperature of the liquid during the processing operation.

In FIG. 16, an amplifier is preferably used to produce a signal proportional to the reference temperature $T_o$, from which the signal proportional to the process liquid temperature T can be electrically subtracted. An input of the amplifier 232 is connected to a positive voltage source through the reference voltage resistor 234, and a feedback resistor 236 is connected between the input and the output of the amplifier and is directly proportional to the reference temperature $T_o$, the value of the reference temperature resistor 234 is inversely proportional to the reference temperature $T_o$, and can be a variable resistor, to allow selection of the reference temperature $T_o$. Also, since the output signal from the amplifier 232 must be equal to the output temperature signal from the thermocouple amplifier at the selected temperature $T_o$, the value of the feedback resistor 236 is determined by the signal characteristics of the thermocouple amplifier 230. Assuming the voltage output signal of the thermocouple amplifier 230 is 10 volts at 500° C., and varies with the temperature T at a rate of 0.02 volts per degree C., the output voltage signal of the reference temperature amplifier 232 is preferably proportional to 0.02 ($-T_o$) volts. Thus, if the positive voltage source is 15 volts, and the value of the temperature resistance 234 is selected to equal $1/T_o \times 10^7$ ohms, the value of the feedback resistor 236 is preferably approximately 13,300 ohms (13.3 K) to produce an output signal of 0.02 ($-T_o$) volts.

This 0.02 ($-T_o$) voltage signal is preferably supplied to an input of a summing amplifier 238 through a 10K resistor, and the 0.02 (T) voltage signal from the thermocouple amplifier 230 is also supplied to the same input of the amplifier through another 10K resistor 242. A 100K feedback resistor 244 is connected between the input and the output of the amplifier 238, to produce an output temperature compensation signal of 0.2 ($T_o-T$) volts, which is supplied to both the conductance and capacitance compensation circuits. When the measured liquid temperature T is equal to the reference temperature $T_o$, there will be no temperature compensation signal.

This 0.2 ($T_o-T$) temperature compensation signal is preferably supplied to an input of the amplifier 246 through a conductance compensation resistor 248, having a value of $1/b \times 10^2$ ohms, which may be a variable resistor to allow this apparatus to be used with different liquids having different "b" values. A 10K feedback resistor 250 is preferably connected between its input and output. The output of the amplifier 246, representing $20b(T_o-T)$, is supplied to an input of the summing amplifier 252 through a 200K scaling resistor 254.

The output signal from the first multiplier 225, which is proportional to the liquid conductance G, is preferably supplied to the input of a log amplifier 258 through a resistor 260. Assuming that the maximum value of this conductance signal is +5 volts full scale, the resistor 260 can be selected to have an ohmic value of 50K, to thus allow a maximum input current of 100 µA to the log amplifier 258, and the log amplifier 258 may be selected to have a transfer function of µlog (Amperes input current/100 µA), so that the voltage output of the log amplifier 258 will preferably be—log G volts.

In preferred embodiments, this—log G signal is also supplied to the input of the summing amplifier 252 through a 10K resistor 255, to produce an output signal of log G+b ($T_o-T$) volts or log $G_o$ volts, since, as discussed earlier, log $G_o$=log G+b ($T_o-T$). This log $G_o$ voltage signal is preferably supplied to an input of an amplifier 256 through a 10K resistor 259, and a 10K feedback resistor 260 is connected between this input and the output of the amplifier 256, to invert the input signal and produce an output signal from the amplifier 256 of—log $G_o$ volts. This—log $G_o$ signal is then supplied to the input of antilog amplifier 262 having a transfer function of $10 \times 10^{-x}$, where x is the input signal, to produce an output signal of 0 to 10 volts that is directly proportional to the conductance $G_o$ of the liquid.

In this permeate conductivity measuring device, the maximum value of the capacitance signal from the second multiplier 226 is −5 volts, and since a full scale positive output of 10 volts proportional to the capacitance $C_o$ of the liquid is desired, the input signal from the second multiplier 226 is shown as −C/2 volts.

The 0.2 ($T_o-T$) volt temperature compensation signal from the amplifier 238 is also supplied to an input of another amplifier 264 through a capacitance compensation resistor 266, having an ohmic value of $1/a \times 10^2$. This capacitance compensation resistor 266 can be a variable resistor, which can be adjusted for use with different liquids having different "a" values. A 5K amplifier feedback resistor 268 is preferably connected between the input and the output of the other amplifier 264, to produce an output signal of that amplifier of −10 [a ($T_o-T$)] volts, which is supplied to a first input of an analog multiplier 270. The −C/2 volt signal from the second multiplier 226 is supplied to a second input of the analog multiplier 270. The analog multiplier 270 has a transfer function of one-tenth of the product of the two input signals, to produce an output signal of a ($T_o-T$) C/2 volts. This output signal of the analog multiplier is supplied to an input of a summing amplifier 272 through a 10K resistor 274. The −C/2 volt signal from the second multiplier 226 is also supplied to the same input of the amplifier 272 through a 10K resistor 276. A 20K feedback resistor 278 is preferably connected between the input and the output of the amplifier, to produce an output voltage signal proportional to C−aC($T_o-T$), or to the capacitance CO of the liquid, since, as discussed earlier, $C_o$=C−aC($T_o-T$).

In a preferred embodiment of a permeate conductivity measuring device, a relatively high frequency of 1000 Hz is selected for the voltage applied across the electrodes of the conductivity cell to reduce the effects of charge transfer kinetics (Faradaic impedance) and electrode polarization, and to enhance the capacitive coupling of the electrodes with the liquid (double layer capacitance). Also, the operational amplifiers and other electronic components used in this embodiment are readily available commercially at this operating frequency. However, the present disclosure is not limited to devices employing this frequency, any frequency within an approximate range of 100 Hz to $10^7$ Hz may be used. Also, the nominal operating temperature range, maximum deviation of the process temperature T from the reference temperature $T_o$, and the maximum absolute signal correction is preferably determined by the choice of circuit components.

In another embodiment of a permeate conductivity measuring device, conductance is measured by an electrodeless device. In such a device, noncontact measurement of the conductance of the liquid is obtained by charging a capacitor in series with the primary winding of a first transformer ring core. The capacitor is periodically discharged so that across the primary winding, a damped oscillatory signal is produced as a result of the capacitor, the inductance of the winding, and inherent resistivity. A loop including for at least a portion of its path the liquid acts as a one-turn secondary winding for the first ring core and as a one-turn primary winding for a second transformer ring core. At the instant the discharge is initiated, a constant voltage appears across by loop regardless of the resistance of the loop so that by measuring the peak current in a secondary winding of the second core, which will appear at the initiation of discharge and which corresponds to the current in the loop at the initiation of the discharge, the conductance of the liquid can be determined using Ohm's law.

It should be appreciated that the conductivity measurement described above is not limited to an assessment of the salinity of the liquid passing through the RO filtration device, but may as easily be applied by those of skill in the art to the measurement of total dissolved solids (TDS).

Additionally, it is not absolutely necessary that the conductance of the liquid be obtained in order to measure salinity or TDS; other means known in the art, such as the density method, or the refractance method, may be employed.

Permeate Flow and Permeate Conductivity Measuring Device

Figure 12:
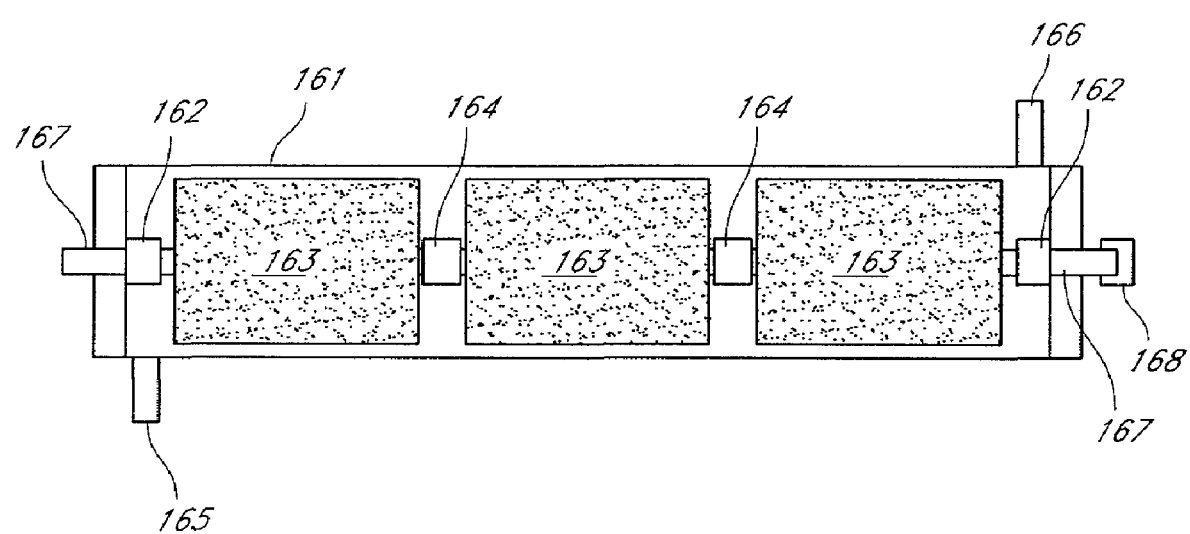
FIG. 12 shows a schematic view of an arrangement of reverse osmosis membrane elements in a pressure vessel.

The system of this disclosure may be employed in the pressure vessel shown in FIG. 12. The pressure vessel is a cylindrical pipe 161 with number of membrane elements 163 inside. The elements are connected to the end plates using adaptors 162 and to each other through interconnectors 164. The pressure vessel has feed and concentrate ports 165 & 166. Permeate leaves the pressure vessel through permeate ports 167. One permeate port is closed with a cap 168. The pressure vessel could be a part of a pressure vessel assembly (RO train), which may contain a large number of pressure vessels connected in parallel. As shown in FIG. 12, membrane elements are enclosed in a pressure vessel, which operates under a pressure of 100-1200 psi. During operation of the RO train the membrane elements are not accessible. Therefore, any complete measurement of element performance has to be conducted by stopping the RO train, removing elements from the pressure vessel and testing them individually in a separate test unit. During operation it is possible to measure the conductivity of the combined permeate from the pressure vessel. It is also possible to measure composite conductivity along the pressure vessel by inserting a small-diameter probing tube through cap 168. Samples of permeate collected at the other end of the probing tube correspond to specific locations in the pressure vessel. However, conductivity results alone are not sufficient to calculate element performance. To calculate element performance, the values of permeate flow along the pressure vessel are required as well. The results of a measurement of permeate flow, permeate conductivity and data of feed pressure, concentrate pressure, feed salinity and temperature enable the calculation of normalized element performance. There has been up to now no convenient way to measure permeate flow of individual membrane elements while they are in operation in an RO unit.

Figure 14:
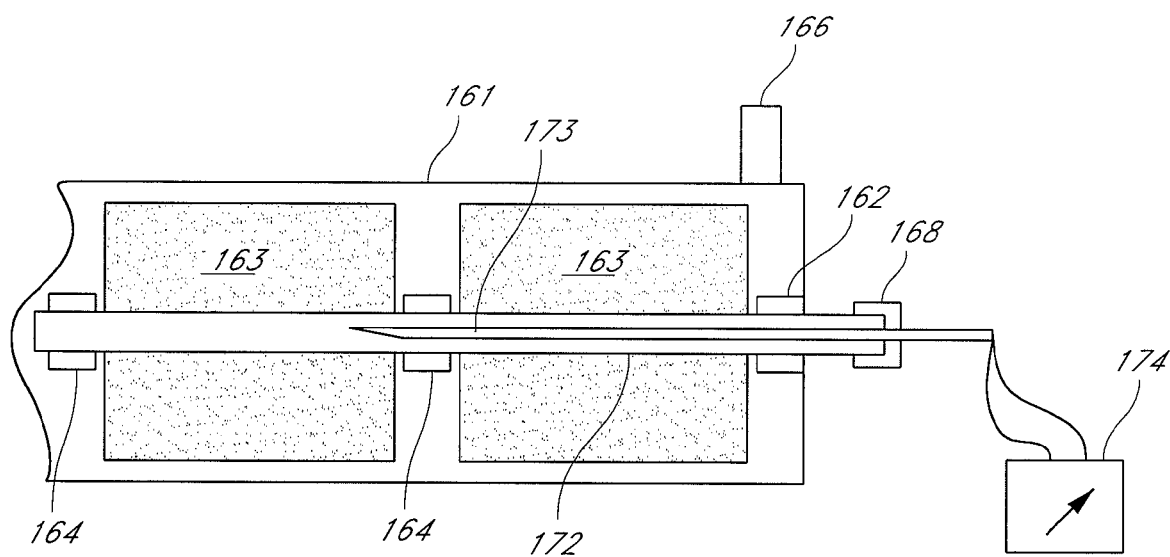
FIG. 14 shows a schematic view of an arrangement of a thermal anemometer sensor mounted on a support tubing inserted in the permeate tube of an RO membrane element.

In an embodiment, an integrated sensor, shown in FIG. 13, comprises a thermal anemometer probe 169 and conductivity probe 170 mounted on a small diameter pipe and protected by an open flow shield 171. As shown in FIG. 14, to conduct measurement, the integrated probe mounted on the supporting small diameter tube 173 is inserted through a small opening in plug 168 into a permeate tube 172. The sensor is connected via wiring to at least one recording device 174. In a preferred embodiment, the recording device is an RFID tag attached to the individual reverse osmosis membrane element in which the inlet side of the probing tube is located. Alternatively, the sensor can generate a signal and send it wirelessly to the recording device. The opening in the plug 168 is normally closed with a small diameter ball valve. Permeate leaves the pressure vessel through the permeate port on the other end of the pressure vessel, which is connected to the permeate manifold. This arrangement enables inserting the probe through the opening of the valve during plant operation while assuring a minimal amount of permeate water leaking outside during the flow and conductivity measurement process. The supporting tubing, with the sensors mounted thereon, is progressively moved inside the connected permeate tubes of the adjacent elements, and permeate flow and conductivity readings are recorded and can be related to specific positions inside the length of the pressure vessel. This may be accomplished in a variety of ways known in the art. For example, the sensors may transmit data to the closest RFID tag, which would be the tag associated with the element in which the inlet side of the probe then resided. Alternatively, electromagnetic radiation generated by a recording device located on a track outside the pressure vessel could be used to serially activate the RFID tags of the individual elements, which would then receive data from the sensors as the probe passed through each element. Such communication would enable the measured values to be linked directly to the individual element in which the sensors were located, which would facilitate the determination of the performance of the individual elements. Alternatively, the measured values could be linked to the individual elements by measuring the length to which the support tubing was inserted into a pressure vessel.

The permeate flowing inside the connected permeate tubes of membrane elements in the pressure vessel has an aggregate rate of permeate flow and permeate conductivity. By taking measurements along the length of connected permeate tubes, it is possible to calculate the contribution of the permeate to the combined flow and conductivity at a given point. The measured values, combined with historical data of the past performance of an element, is important in determining the current condition of the elements in the system. It also provides information required for the selection of elements that have to be replaced to improve system performance.

Because conductivity of the permeate corresponding to specific locations in the pressure vessel may be measured at the outlet end of the probing tube, it is not necessary that conductivity be measured at the inlet end of the probing tube. In an embodiment, the probing tube comprises only a mechanism for measuring permeate flow at the inlet end, while permeate conductivity is measured at the outlet end.

Although all possible embodiments are not listed, the present disclosure encompasses different embodiments that incorporate various changes, corrections and modifications based on the knowledge of those skilled in the art. It should be clearly understood that the forms of the present disclosure are illustrative only and not intended to limit the scope thereof. Modifications to these embodiments are also included in the scope of the present disclosure, as long as they do not deviate from the spirit of the disclosure.

What is claimed is:

1. A system that permits assessment of performance of a reverse osmosis membrane element, comprising:
   said reverse osmosis membrane element;
   a permeate tube within said reverse osmosis membrane element;
   an elongated probing tube within the permeate tube of said reverse osmosis membrane element;
   at least one sensor configured to measure a value used to assess said performance and disposed at an inlet side of said probing tube wherein said sensor is additionally provided with an RFID tag, and said value is linked to a reverse osmosis membrane element via communication between said RFID tag and an RFID tag mounted on said element; and a recording device in electronic communication with said sensor so as to record results of said measurement.

2. The system of claim 1, wherein said sensor configured to measure a value used to assess said performance comprises a sensor for measuring permeate flow.

3. The system of claim 2, wherein said sensor for measuring permeate flow comprises a thermal anemometer sensor.

4. The system of claim 1, further comprising a sensor for measuring permeate conductivity.

5. The system of claim 4, wherein said sensor for measuring permeate conductivity comprises a conductivity cell with an integrally mounted thermocouple.

6. The system of claim 1, wherein a power source powers said sensor.

7. The system of claim 6, wherein said power source comprises at least one radio frequency identification (RFID) tag.

8. The system of claim 1, wherein said electronic communication is conducted via wiring connecting said recording device and said sensor.

9. The system of claim 1, wherein said electronic communication is conducted via a wireless connection connecting said recording device and said sensor.

10. A method of assessing performance of reverse osmosis membrane elements, said method comprising:
 a) providing a system that permits assessment of performance of a reverse osmosis membrane element in a pressure vessel containing at least one said element, said system comprising:
  said reverse osmosis membrane element;
  a permeate tube within said reverse osmosis membrane element;
  an elongated probing tube within the permeate tube of said reverse osmosis membrane element;
  at least one sensor configured to measure a value used to assess said performance and disposed at an inlet side of said probing tube, wherein said sensor is additionally provided with an RFID tag, and said value is linked to a reverse osmosis membrane element via communication between said RFID tag and an RFID tag mounted on said element; and
  a recording device in electronic communication with said sensor so as to record results of said measurement;
 b) measuring at least one said value;
 c) transmitting results of said measurement to said recording device; and
 d) assessing said performance based on said results.

11. A method of assessing performance of reverse osmosis membrane elements in accordance with claim 10, wherein said at least one value comprises data relating to permeate flow.

12. A method of assessing performance of reverse osmosis membrane elements in accordance with claim 11, wherein said at least one value additionally comprises data relating to permeate conductivity.

13. A method of assessing performance of reverse osmosis membrane elements in accordance with claim 10, additionally comprising:
 e) replacing said element if said assessment indicates replacement is required to improve system performance.

* * * * *

UNITED STATES PATENT AND TRADEMARK OFFICE
CERTIFICATE OF CORRECTION

PATENT NO.        : 7,584,061 B2                                        Page 1 of 1
APPLICATION NO. : 11/716798
DATED             : September 1, 2009
INVENTOR(S)       : Mark Wilf et al.

It is certified that error appears in the above-identified patent and that said Letters Patent is hereby corrected as shown below:

At column 4, Line 40, please change "hw" to --$h_w$--.

At column 5, Line 62-64, please change

"
$$T = \frac{2}{a^2} \sum_{n=1}^{\infty} e^{-kan^2 t} \left[ \frac{an^2 J_o(\alpha_n r)}{(h^2 + \alpha_n^2) J_0^2(\alpha_n a)} \right] \int_0^\alpha rf(r) J_o(\alpha n') dr$$
"

to $$T = \frac{2}{a^2} \sum_{n=1}^{\infty} e^{-kan^2 t} \left[ \frac{an^2 J_o(\alpha_n r)}{(h^2 + \alpha_n^2) J_o^2(\alpha_n a)} \right] \int_0^a rf(r) J_o(\alpha n') dr$$

-- --.

At column 13, Line 58, change "of µlog" to --of µ log--.

At column 14, Line 36, change "CO" to --$C_o$--.

Signed and Sealed this

Thirtieth Day of March, 2010

David J. Kappos
*Director of the United States Patent and Trademark Office*